United States Patent
Ungermann et al.

(10) Patent No.: US 10,381,962 B2
(45) Date of Patent: Aug. 13, 2019

(54) METHOD, APPARATUS AND SYSTEM FOR OPERATING A ROTATING ELECTRIC MACHINE

(71) Applicant: Robert Bosch GmbH, Stuttgart (DE)

(72) Inventors: Michael Ungermann, Linsengericht (DE); Daniel Zirkel, Wiernsheim-Serres (DE); Mario Beyer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 234 days.

(21) Appl. No.: 15/030,644

(22) PCT Filed: Oct. 21, 2014

(86) PCT No.: PCT/EP2014/072484
§ 371 (c)(1),
(2) Date: Apr. 20, 2016

(87) PCT Pub. No.: WO2015/059110
PCT Pub. Date: Apr. 30, 2015

(65) Prior Publication Data
US 2016/0248353 A1     Aug. 25, 2016

(30) Foreign Application Priority Data
Oct. 25, 2013   (DE) ........................ 10 2013 221 767

(51) Int. Cl.
*H02P 6/16*     (2016.01)
*G01D 5/244*    (2006.01)

(52) U.S. Cl.
CPC ............. *H02P 6/16* (2013.01); *G01D 5/2448* (2013.01); *G01D 5/24476* (2013.01)

(58) Field of Classification Search
USPC ................. 318/652, 400.1, 467, 543, 484
See application file for complete search history.

(56) References Cited

U.S. PATENT DOCUMENTS

| 5,408,872 A | 4/1995 | Nonaka |
| 2006/0042074 A1 | 3/2006 | Stork et al. |

(Continued)

FOREIGN PATENT DOCUMENTS

| EP | 1308696 | 5/2003 |

OTHER PUBLICATIONS

International Search Report for Application No. PCT/EP2014/072484 dated Jan. 28, 2015 (English Translation, 2 pages).

*Primary Examiner* — Bickey Dhakal
(74) *Attorney, Agent, or Firm* — Michael Best & Friedrich LLP

(57) ABSTRACT

The invention provides a method, an apparatus and a system 1 for operating a rotating electric machine. The method has the following steps: defining (S01) a rotor position angle reference value of a rotor of the rotating electric machine (REM); determining (S02) a first rotor position angle measured value of the rotor during operation in the case of essentially a first speed of the rotor by means of a rotor position detection device (REE) of the rotating electric machine (REM); determining (S03) a second rotor position angle measured value of the rotor during operation in the case of essentially a second speed of the rotor by means of the rotor position detection device (REE) of the rotating electric machine (REM), wherein the second speed of the rotor differs from the first speed of the rotor; defining (S04) a first angular offset as the difference between the first rotor position angle measured value and the rotor position angle reference value; defining (S05) a second angular offset as the difference between the second rotor position angle measured value and the rotor position angle reference value; and calculating (S06) a signal delay of the rotor position detection device (REE) on the basis of the defined first angular (Continued)

offset, the defined second angular offset, the first speed of the rotor and the second speed of the rotor.

15 Claims, 3 Drawing Sheets

(56) References Cited

U.S. PATENT DOCUMENTS

| | | | | |
|---|---|---|---|---|
| 2007/0132423 A1* | 6/2007 | Ajima | ...................... | H02P 6/10 |
| | | | | 318/719 |
| 2009/0001912 A1* | 1/2009 | Miyajima | ................. | H02P 6/15 |
| | | | | 318/400.04 |
| 2009/0105909 A1* | 4/2009 | Yamaguchi | ............ | B62D 5/049 |
| | | | | 701/41 |
| 2014/0119489 A1* | 5/2014 | Kato | .................... | B60W 50/00 |
| | | | | 377/16 |

* cited by examiner

METHOD, APPARATUS AND SYSTEM FOR OPERATING A ROTATING ELECTRIC MACHINE

BACKGROUND OF THE INVENTION

The present invention relates to a method and an apparatus for operating a rotating electric machine. Said invention particularly relates to a method for calculating a signal delay of a rotor position detection device of the rotating electric machine, a method for calculating an angular offset of the rotor position detection device and a method for controlling the rotating electric machine as well as respectively corresponding apparatuses in an open-loop or closed-loop manner. The invention further relates to a system for operating a rotating electric machine.

During operation of rotating electric machines, in particular when controlling said machines in an open-loop or closed-loop manner, it may be necessary to define a rotor position angle of a rotor of the rotating electric machine. This is, for example, the case when controlling synchronous machines in an open-loop or closed-loop manner, such as permanently excited synchronous machines or electrically excited synchronous machines. Such synchronous machines are used, for example, in hybrid and electric vehicles.

In order to determine the rotor position angle, different types of sensors are known, for example digital angle sensor signals, resolvers, etc. Electronic circuits with characteristic dead times can lead to a signal delay of the rotor position angle signal, which transmits information about the rotor position angle for further processing.

Depending on the rotational speed of the rotating electric machine, signal delays in the measurement chain of the rotor position angle signal lead to different angular errors or angular offsets. The angular offset is a difference, which is generally a function of rotational speed, between an actual rotor position angle value and a rotor angle position value, which is, for example, used as an input for a control system. As a result, the angular offset is all the greater, the faster the rotor of the electric machine rotates (high rotational speed) and the greater the signal delay, i.e. the dead time, is for corresponding electronics. Particularly in the case of rotating electric machines comprising a large number of pole pairs, it is advantageous to define the angular offset as precisely as possible. The signal delay of the rotor position detection device, which can determine rotor position angle measured values of the rotor, respectively of individual components contained therein, is typically specified by manufacturers within a defined tolerance range. The signal delay of a concrete rotor position detection device or, respectively, of the individual components thereof varies within this tolerance range, can however be substantially constant over the service life of the rotor position detection device.

The European patent specification EP 1 308 696 A2 describes a goniometer with offset compensation, which determines an angle to be measured on the basis of a corresponding sinusoidal signal and cosine signal. A method for offset compensation which is further described consists of determining the amplitude of the cosine and/or sinusoidal signal and defining the associated offset value on the basis of the determined amplitude value.

SUMMARY OF THE INVENTION

The insight underlying the present invention is that determining the signal delay of a rotor position detection device during operation of a rotating electric machine enables a particularly precise calculation of an angular offset of the rotor position angle which is dependent on the rotational speed of the electric machine. On the basis of the angular offset of the rotor position angle, which was particularly precisely calculated, the rotating electric machine can, for example, be particularly efficiently controlled in an open-loop or closed-loop manner.

The concept underlying the present invention then consists of taking into account the aforementioned insight and defining a signal delay of a rotor position detection device on the basis of rotor position angle measured values.

Requirements placed on the signal processing of the angle signal with regard to dead times can therefore be reduced. As a result, the use of more cost effective components, for example in the rotor position detection device, is possible. In addition, an operation of the rotating electric machine that maximizes efficiency can be ensured by compensation of the dead time.

According to one preferred modification to the invention, the method according to the invention comprises the step: calculating a constant angular offset component from the defined first and/or the defined second angular offset using the calculated signal delay. The constant angular offset component can be significantly defined by the installation position of the rotor in an electric machine. By means of the calculations of the constant angular offset component, it may be possible to readjust an installation position of the rotor in certain cases. The constant angular offset component can be calculated once or even regularly or on demand of a user. The constant angular offset component can, for example, be recalculated if the vehicle was involved in an accident.

According to a further preferred modification to the invention, the method can comprise the following step: calculating a third angular offset in the case of a third rotational speed of the rotor as the sum of the constant angular offset component and the product of the determined signal delay and the third rotational speed of the rotor. The calculation of the third offset can be repeated as often as desired and can therefore be used as a correction factor for a rotor position angle measured value of the rotor position angle detection device. That means that functions which require as precise a value as possible for the rotor position angle of the rotor at a defined rotational speed can use a rotor position angle measured value of the rotor position detection device, which was raised or lowered by the calculated, speed-dependent third angular offset, which was calculated using the defined rotational speed.

According to a further preferred modification to the invention, the method according to the invention comprises the following step: controlling the rotating electric machine in an open-loop and or closed-loop manner on the basis of the calculated third angular offset. In so doing, the rotating electric machine can be operated particularly efficiently because the open-loop or closed-loop control device constantly has a very precise value for the rotor position angle available, which approximates the actual rotor position angle particularly well. The efficiency of the rotating electric machine can thereby be significantly improved.

According to a further preferred modification to the method according to the invention, at least one further angular offset is defined which is in each case a difference between each further rotor position angle measured value that has been determined and the rotor position angle reference value. That means third, fourth, fifth, etc. rotor position angle measured values of the rotor can be determined in the case of essentially third, fourth, fifth, etc.

rotational speeds of the rotor by means of the rotor position detection device of the rotating electric machine. The calculation of the signal delay can furthermore be based on the further angular offsets that have been determined.

The signal delay or the dead time can, for example, be calculated with the aid of an optimization algorithm; however, two determined rotor position measurement values can be used in each case to calculate a signal delay value, the signal delay being ultimately calculated by averaging the signal delay values that have been calculated. In this case, the averaging can also be a weighted averaging. For example, it could be known that particularly exact rotor position angle measured values can be determined at a high or a low rotational speed. In this case, signal delay values which are based on determined rotor position angle measured values in the case of essentially such rotational speeds could be particularly heavily weighted when carrying out the weighted averaging. That means the weighted averaging can be based on known measurement inaccuracies of the rotor position detection device, for example on measurement inaccuracies that are dependent on rotational speed.

It is also conceivable to use, for example, such rotor position angle measured values, which were determined in the case of essentially such rotational speeds, in each case to calculate the signal delay value in order to compensate for known measurement inaccuracies of the rotor position detection device. This allows known measurement inaccuracies of the rotor position detection device to mutually cancel each other out to a large extent.

According to a further preferred embodiment, a known rotor position at a point of intersection of two phase-to-phase voltage curves of the rotating electric machine is determined as the rotor position reference value. The voltage curves can relate to curves of input and/or output voltages of the electric machine. This can, for example, relate to phase-to-phase voltages of a three phase alternating current. The point of intersection of two phase-to-phase voltage curves at practically a constant rotational speed of the rotor constitutes a distinct rotor position. Thus, a reference signal for the rotor position, i.e. a rotor position reference value, is available at discrete points in time by a phase voltage comparison being carried out. Alternatively, the rotor position reference value can also be determined via the curve of short circuit currents of the rotating electric machine because the short circuit currents have similar reference points with regard to the rotor position.

According to a preferred modification to the apparatus according to the invention, a computing device is furthermore designed to calculate a constant angular offset component of the first and/or the second angular offset that were determined using the calculated signal delay.

According to a further preferred modification to the apparatus, the computing device is furthermore designed to calculate a third angular offset in the case of a third rotational speed of the rotor as the sum of the constant angular offset component and the product of the determined signal delay and the third rotational speed of the rotor.

According to a further preferred modification, the computing device is furthermore designed to control the rotating electric machine on the basis of the third angular offset that was calculated. The rotating electric machine can also be designed in such a manner that said machine is controlled in a closed loop manner on the basis of the third angular offset that was calculated.

BRIEF DESCRIPTION OF THE DRAWINGS

The present invention is explained below in greater detail using the exemplary embodiments depicted in the schematic figures of the drawings. In the drawings.

In all figures of the drawings, identical or functionally identical elements and apparatuses are provided with the same reference signs provided that nothing else is specified.

DETAILED DESCRIPTION

Figure 1:
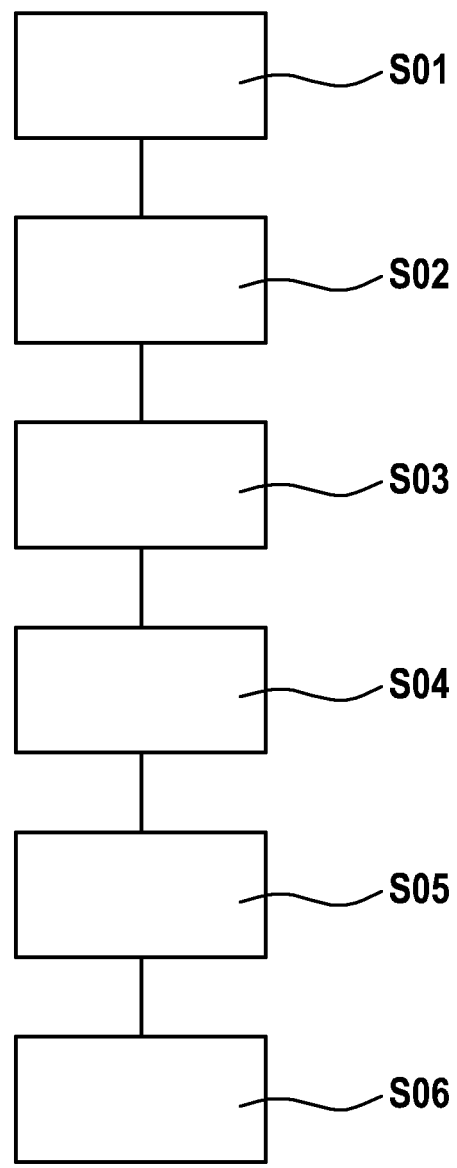
FIG. 1 shows a schematic flow diagram for explaining a method according to the invention for operating a rotating electric machine according to a first embodiment of the present invention.

FIG. 1 shows a schematic flow diagram for explaining a method according to the invention according to a first embodiment of the present invention. In the description of FIG. 1, reference is made in part to reference signs which describe elements of FIG. 3.

The method according to the first embodiment is based on an angular offset of the rotor position angle, i.e. a difference between an output rotor position angle value and the actual electrical rotor position angle, which can be described by the following formula: $\Delta\varphi i = \varphi off + Tt \cdot \omega i$.

$\Delta\varphi i$ describes an ith angular offset, $\varphi off$ a constant angular offset component, $Tt$ a dead time, i.e. a signal delay and $\omega i$ an ith rotational speed of the rotor of the rotating electric machine, REM.

In a method step S01, a rotor position reference value $\varphi ref$ of a rotor of a rotating electric machine, REM, for instance a synchronous machine, is defined. To this end, a point of intersection of two phase-to-phase voltage curves is determined at approximately a constant rotational speed $\varphi$ of the rotor which speed can unambiguously be associated with a rotor position, i.e. a rotor position angular value. The associated rotor position angle value is defined at the rotor position angle reference value $\varphi pref$. A point of intersection can, for example, be used which lies temporally the least far back.

In a further step S02, a first rotor position angle measured value $\varphi 1$ of the rotor during operation is determined in the case of essentially a first rotational speed $\omega 1$ of the rotor by means of the rotor position detection device REE of the rotating electric machine, REM. "Essentially" refers here to the fact that the first rotational speed $\omega 1$—and all further rotational speeds $\omega i$—can vary within the scope of a small error due to technical reasons.

In a further step S03, a second rotor position angle measured value $\varphi 2$ of the rotor is determined during operation in the case of essentially a second rotational speed $\omega 2$ of the rotor by means of the rotor position detection device, REE, of the rotating electric machine, REM.

In a further step S04, a first angular offset $\Delta\varphi 1$ is defined as the difference between the first rotor position angle measured value $\varphi 1$ and the rotor position angle reference value $\varphi ref$. That means: $\Delta\varphi 1 = \varphi 1 - \varphi ref$. This step can be performed by means of a computing device CAL which is coupled to the rotor position detection device REE.

In a further step S05, a second angular offset $\Delta\varphi 2$ is defined as the difference between the second rotor position angle measured value $\Delta\varphi 2$ and the rotor position angle reference value $\varphi ref$. That means: $\Delta\varphi 2 = \varphi 2 - \varphi ref$. This defining operation can likewise be performed by the computing device CAL.

In a further step S06, a signal delay, more precisely a dead time, of the rotor position detection device REE is calculated on the basis of the defined first angular offset $\Delta\varphi1$, the defined second angular offset $\Delta\varphi2$, the first rotational speed $\omega1$ of the rotor and the second rotational speed $\omega2$ of the rotor. According to the first embodiment, the calculating operation S06 is carried out by means of the formula:

$$Tt=(\Delta\varphi1-\Delta\varphi2)/(\omega1-\omega2).$$

This defining operation can likewise be performed by the computing device CAL.

Calculating S06 the dead time, for example by means of the computing device CAL, can, for example, be carried out for the rotor position detection device REE at one particular time or also continuously at regular intervals or on demand of a user. If the dead time is calculated S06 at regular intervals, a signal delay which changes with the increasing age of the rotor position detection device REE can, for example, be taken into account and thus compensated. The first and second rotational speeds $\omega1$, $\omega2$ can be predefined rotational speeds; they can, however, also be randomly selected, for example each time the dead time is recalculated anew. The method according to the first embodiment—or another method according to the invention—can also be carried out in each case several times in succession, for instance with ever varying first and second rotational speeds $\omega1$, $\omega2$, wherein an average is formed from the individual, calculated dead time values in order to obtain a final result for the dead time.

Figure 2:
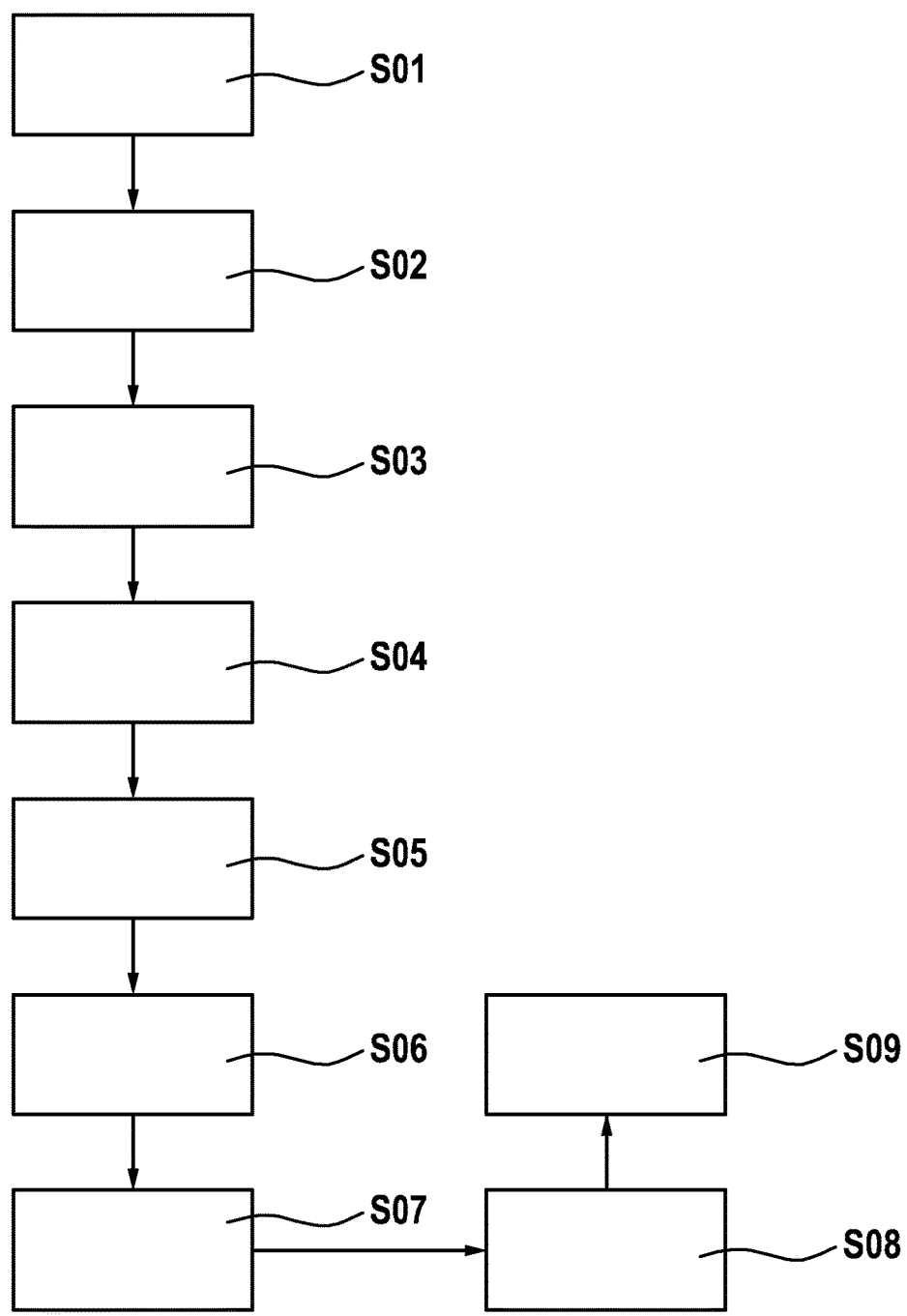
FIG. 2 shows a schematic flow diagram for explaining a method according to the invention for operating a rotating electric machine according to a second embodiment of the present invention.

FIG. 2 shows a schematic flow diagram for explaining a method for operating a rotating electric machine according to a second embodiment of the present invention.

The method according to the second embodiment has the same steps as the method according to the first embodiment and additionally comprises the following steps:

In a step S07, a constant angular offset component $\varphi$off is calculated from the defined first and/or the defined second angular offset $\Delta\varphi1$, $\Delta\varphi2$ using the calculated signal delay Tt. According to the second embodiment, this calculation is carried out using the formula $\Delta\varphi1=\varphi\text{off}+Tt\cdot\omega1$, i.e. $\varphi\text{off}=\Delta\varphi1-Tt\cdot\omega1$. Alternatively, the formula $\varphi\text{off}=\Delta\varphi2-Tt\cdot\omega2$ could also be used. Both formulas can also be used. A more accurate constant angular offset component $\varphi$off can, for example, be defined by a mean value being calculated from the results of the two formulas. If a multiplicity of angular offsets $\Delta\varphi i$ is defined, a—weighted or unweighted—mean value of individual results can also be calculated in order to calculate a particularly accurate constant angular offset component. The calculations can be carried out by means of the computing device CAL.

In a further step S08, a third angular offset $\Delta\varphi3$ in the case of a third rotational speed $\omega3$ of the rotor is calculated as the sum of the constant angular offset component $\varphi$off and the product of the determined signal delay Tt and the third rotational speed of the rotor $\omega3$. That means: $\Delta\varphi3=\varphi\text{off}+Tt\cdot\omega3$. If another formula is alternatively used for calculating an angular offset, this other formula can be used to calculate the third angular offset $\Delta\varphi3$. This calculation can likewise be carried out by the computing device.

In a further step S09, the rotating electric machine REM is controlled in an open-loop or closed-loop manner on the basis of the calculated third angular offset $\Delta\varphi3$. The control operation S09 can be carried out by a control device CTR which is coupled to the rotor position detection device REE and/or to the computing device CAL. A permanently excited synchronous machine or an electrically excited synchronous machine, the rotor of which rotates at the third rotational speed $\omega3$, can particularly be controlled on the basis of a rotor position angle, which results from the summation of a third rotor position angle measured value determined using the rotor position detection device REE and the calculated third angular offset $\Delta\varphi3$. That means that the third angular offset $\Delta\varphi3$, which was calculated in the case of the third rotational speed $\omega3$, can be compensated in order to operate the synchronous machine at the third rotational speed $\omega3$.

Figure 3:
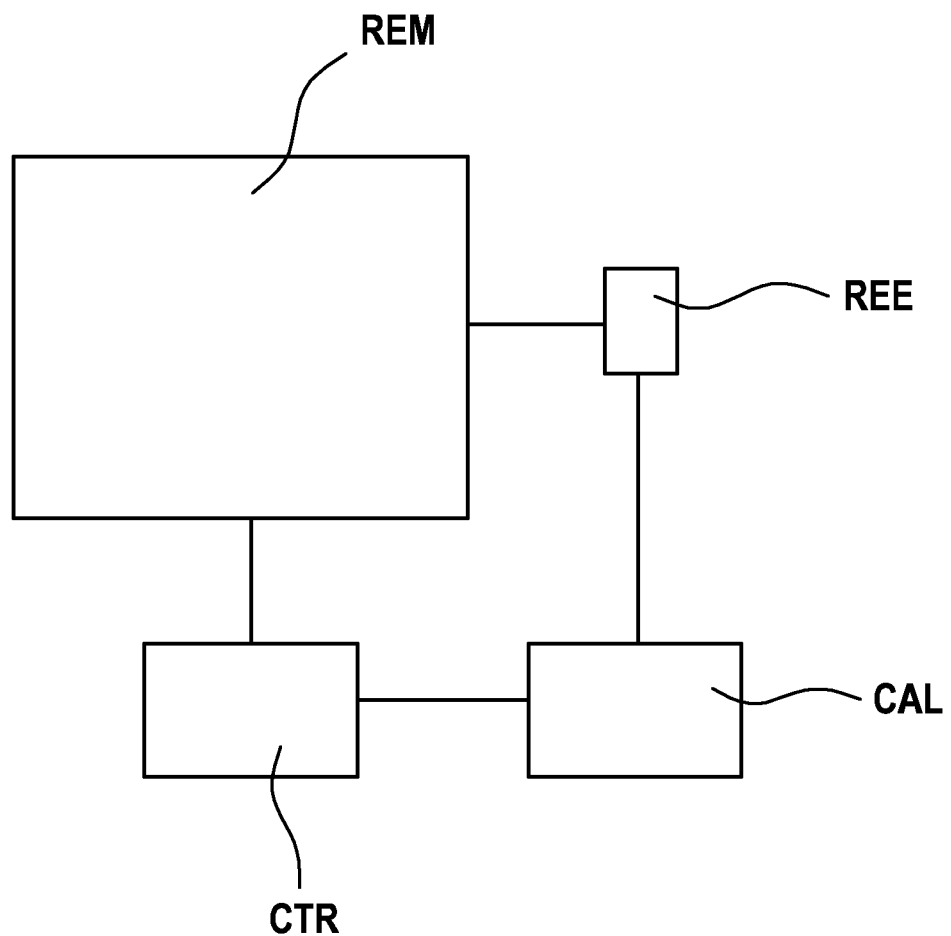
FIG. 3 shows a schematic view of a system for operating a rotating electric machine, REM, according to a third embodiment of the present invention.

FIG. 3 shows a schematic view of a system for operating a rotating electric machine REM according to a third embodiment of the present invention.

According to FIG. 3, the rotor position detection device REE, the control device CTR and the computing device CAL are coupled to the rotating electric machine REM.

The invention claimed is:

1. A method for operating a rotating electric machine (REM) the method comprising:
   defining (S01) a rotor position angle reference value of a rotor of the rotating electric machine (REM);
   determining (S02) a first rotor position angle measured value of the rotor during operation in the case of essentially a first rotational speed of the rotor by a rotor position detection device (REE) of the rotating electric machine (REM);
   determining (S03) a second rotor position angle measured value of the rotor during operation in the case of essentially a second rotational speed of the rotor by the rotor position detection device (REE) of the rotating electric machine (REM), wherein the second rotational speed of the rotor differs from the first rotational speed of the rotor;
   defining (S04), by a computing device (CAL), a first angular offset as the difference between the first rotor position angle measured value and the rotor position angle reference value;
   defining (S05), by the computing device (CAL), a second angular offset as the difference between the second rotor position angle measured value and the rotor position angle reference value;
   calculating, by the computing device (CAL), (S06) a signal delay of the rotor position detection device (REE) on the basis of the defined first angular offset, the defined second angular offset, the first rotational speed of the rotor, and the second rotational speed of the rotor; and
   operating the rotating electric machine (REM) taking into account the calculated signal delay of the rotor position detection device (REE).

2. The method according to claim 1, further comprising:
   calculating (S07) a constant angular offset component from the defined first and/or second angular offset using the calculated signal delay.

3. The method according to claim 2 further comprising:
   calculating (S08) a third angular offset in the case of a third rotational speed of the rotor as the sum of the constant angular offset component and the product of the determined signal delay and the third rotational speed of the rotor.

4. The method according to claim 3 further comprising:
   controlling (S09) the rotating electric machine (REM) on the basis of the calculated third angular offset.

5. The method according to claim 1, wherein at least one further angular offset is defined, which is in each case a difference between respectively one determined further rotor position angle measured value and the rotor position angle reference value; and wherein calculating (S06) the signal delay is furthermore based on the defined further angular offsets.

6. The method according to claim 1, wherein a known rotor position at a point of intersection of two phase-to-phase voltage curves of the rotating electric machine (REM) is defined (S01) as the rotor position reference value.

7. The method according to claim 3 further comprising:
controlling (S09) the rotating electric machine (REM) in an open-loop manner on the basis of the calculated third angular offset.

8. The method according to claim 3 further comprising:
controlling (S09) the rotating electric machine (REM) in a closed-loop manner on the basis of the calculated third angular offset.

9. An apparatus for operating a rotating electric machine (REM), comprising:
a rotor position detection device (REE) which is configured to determine (S02) a first rotor position angle measured value during operation in the case of essentially a first rotational speed of a rotor of the rotating electric machine (REM) and to determine (S03) a second rotor position angle measured value during operation in the case of essentially a second rotational speed of the rotor of the rotating electric machine (REM); and
a computing device (CAL) which is designed to:
define (S04) a first angular offset as the difference between the first rotor position angle measured value and a rotor position angle reference value,
define (S05) a second angular offset as the difference between the second rotor position angle measured value and the rotor position angle reference value and
calculate (S06) a signal delay of the rotor position detection device (REE) on the basis of the defined first angular offset, the defined second angular offset, the first rotational speed of the rotor and the second rotational speed of the rotor.

10. The apparatus according to claim 9, wherein the computing device (CAL) is further configured to calculate (S07) a constant angular offset from the defined first and second angular offsets using the calculated signal delay.

11. The apparatus according to claim 10, wherein the computing device (CAL) is further configured to calculate (S08) a third angular offset in the case of a third rotational speed of the rotor as the sum of the constant angular offset component and the product of the determined signal delay and the third rotational speed of the rotor.

12. The apparatus according to claim 11, wherein the computing device (CAL) is further configured to control (S09) the rotating electric machine (REM) in an open-loop manner based on the calculated third angular offset and
wherein the rotating electric machine (REM) is configured in such a way that said machine is controlled (S09) in a closed-loop manner on the basis of the calculated third angular offset.

13. The apparatus according to claim 11, wherein the computing device (CAL) is further configured to control (S09) the rotating electric machine (REM) in an open-loop manner based on the calculated third angular offset.

14. The apparatus according to claim 11, wherein the computing device (CAL) is further configured to control (S09) the rotating electric machine (REM) in a closed-loop manner on the basis of the calculated third angular offset.

15. A system for operating a rotating electric machine comprising the rotating electric machine (REM); and
an apparatus for operating the rotating electric machine (REM) according to claim 9.

* * * * *